United States Patent [19]

Mizuma et al.

[11] Patent Number: 4,838,607
[45] Date of Patent: Jun. 13, 1989

[54] ARRANGEMENTS FOR FORMING ROOF STRUCTURES OF VEHICLE BODIES

[75] Inventors: Takashi Mizuma, Hiroshima; Koji Nakao, Higashihiroshima, both of Japan

[73] Assignee: Mazda Motor Corporation, Hiroshima, Japan

[21] Appl. No.: 60,401

[22] Filed: Jun. 11, 1987

[30] Foreign Application Priority Data

Jun. 16, 1986 [JP] Japan .................. 61/141014

[51] Int. Cl.$^4$ .............................................. B60J 7/06
[52] U.S. Cl. ................................. 296/219; 296/216
[58] Field of Search .............................. 296/219, 216

[56] References Cited

U.S. PATENT DOCUMENTS

| 1,413,424 | 4/1922 | Peczenik | 296/219 |
| 1,950,371 | 3/1934 | Baier | 296/219 |

FOREIGN PATENT DOCUMENTS

| 297408 | 9/1928 | United Kingdom | 296/219 |
| 334091 | 8/1930 | United Kingdom | 296/219 |
| 339805 | 12/1930 | United Kingdom | 296/219 |
| 1315364 | 5/1973 | United Kingdom . | |

Primary Examiner—Dennis H. Pedder
Attorney, Agent, or Firm—Gerald J. Ferguson, Jr.

[57] ABSTRACT

An arrangement for forming a roof structure of a vehicle body comprises a set of front and rear roof panel members disposed to face each other with an opening between, and a pair of roof rail members disposed at both sides of the front and rear roof panel members to extend in a direction of the length of the vehicle body respectively and face each other with the opening between. The roof rail members include inner and outer panels connected together and a connecting flange which projects laterally toward the inside of the vehicle body. A frame member is disposed to engage partially with the front and rear roof panels and the roof rail members so as to form a loop surrounding the opening. The frame member is provided with outer portions thereof fixed on the outer panels of the roof rail members and inner portions, fixed and supported partially by the connecting flange, for securing a pair of guide rail members, each extending along the roof rail members. A foldable canvas top is provided along with a plurality of sliding members each engaging with the guide rail members provided on the frame member and disposed for selectively covering or uncovering the opening.

10 Claims, 4 Drawing Sheets

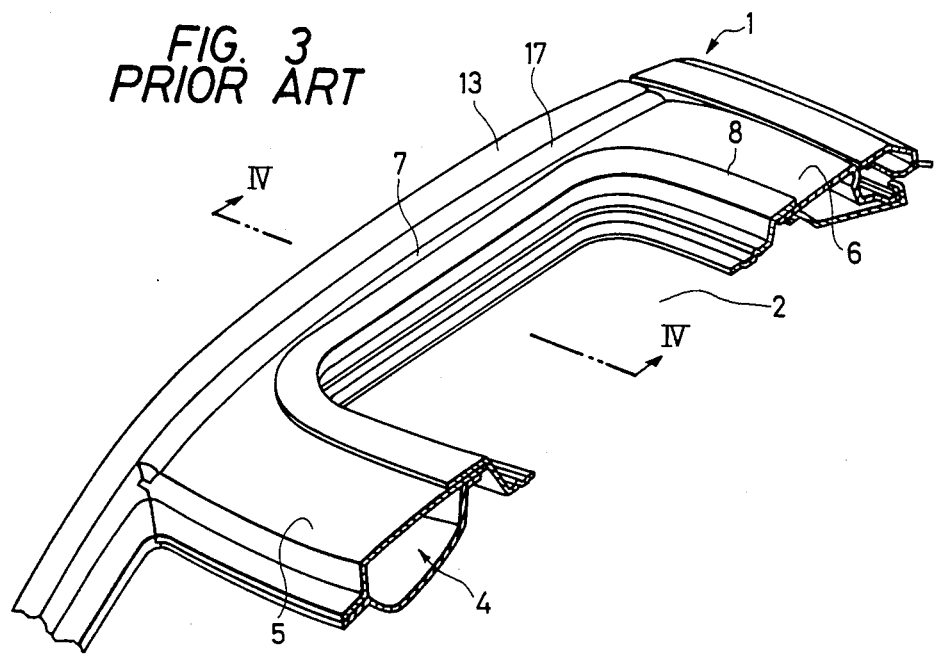
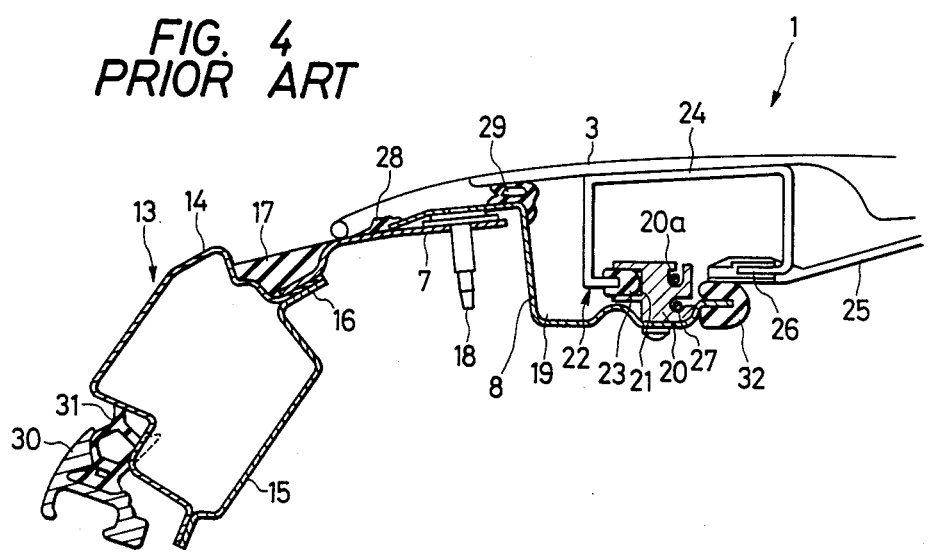

ARRANGEMENTS FOR FORMING ROOF STRUCTURES OF VEHICLE BODIES

BACKGROUND OF THE INVENTION

1. Field of the Invention

The present invention relates generally to arrangements for forming roof structures of vehicle bodies, and more particularly, is directed to an improvement in roof structure of a vehicle body which includes a foldable canvas top for covering an opening provided on a roof portion of the vehicle body to be openable.

2. Description of the Prior Art

There has been proposed a vehicle body provided with an opening on a roof portion thereof and a foldable canvas top for covering the opening to be openable, so that such open-air feeling as enjoyable with an open car can be obtained, as disclosed in, for example, the specification of British patent No. 1 315 364. A roof structure which is employed in the previously proposed vehicle body having the opening at the roof portion thereof and the foldable canvas top for covering the opening is constituted by way of example as shown in FIGS. 1 to 4.

In the roof structure shown in FIGS. 1 to 4, a roof portion 1 of a vehicle body is provided with an opening 2 and a foldable canvas top 3 for covering the opening 2 to be openable. The foldable canvas top 3 is made of flexible and waterproof sheet material and can be folded in such a manner as shown in FIG. 1 to open the opening 2 and thereby an open-air feeling as enjoyable with the open car can be obtained.

The roof portion 1 of the vehicle body comprises a roof panel 4 on which the opening 2 is formed, as shown in FIG. 2. The roof panel 4 is provided with a front panel portion 5, a rear panel portion 6 and a pair of side panel portions 7 each interconnecting the front and rear panel portions 5 and 6 to form the opening 2 and produced by means of press working in a body.

As shown in FIG. 3, a frame member 8 is engaged with an inner fringe portion of the roof panel 4 to form a loop surrounding the opening 2. This frame member 8 supports the foldable canvas top 3 (omitted to be illustrated in FIG. 3) to be movable for opening and closing the opening 2, as shown in FIG. 4 which is a fragmentary sectional view taken on line IV—IV in FIG. 3.

Referring to FIG. 4, a roof rail member 13 which comprises an outer rail panel 14 and an inner rail panel 15 connected with each other to form a closed cross section is provided at each side of the roof portion 1 to extend in a direction of the length of the vehicle body and to be connected at both end portions thereof to a front pillar and a rear pillar, respectively. The outer rail panel 14 and inner rail panel 15 form a connecting flange portion 16 extending in the direction of the length of the vehicle body at the upper portion of the roof rail member 13 and the side panel portion 7 of the roof panel 4 is fixed on the connecting flange portion 16. A roof molding 17 is put in a hollow between the outer rail panel 14 of the roof rail member 13 and the side panel portion 7 of the roof panel 4 for waterproofing and improving an external appearance of the vehicle body, as shown also in FIG. 3.

The outer fringe of the frame member 8 is superposed on the inner fringe of the side panel portion 7 and fixed thereto by means of a plurality of fasteners 18. The frame member 8 is provided with a rain gutter 19 having drain openings (not shown in the drawings) and a guide rail member 20 having a guide groove 21 and extending in the direction of the length of the vehicle body.

A plurality of sliding members 22 connected to the foldable canvas top 3 are engaged with the guide rail member 20 to be movable along the same. Each of the sliding member 22 comprises a sliding shoe 23, a supporting portion 24 to which the foldable canvas top 3 is attached, and a bracket portion 26 on which a stay 25 for supporting a intermediate portion of the foldable canvas top 3 is mounted. Further, wires 27 are put in wire containing grooves 20a respectively formed on the guide rail member 20 and the foldable canvas top 3 is moved in the direction of the length of the vehicle body when the wires are caused to run in the wire containing grooves 20a by a wire driver (not shown in the drawings). For waterproofing and soundproofing, sealing members 28, 29 and 32 are attached to the frame member 8, and in addition, another sealing member 31 is provided between the outer rail panel 14 of the roof rail member 13 and a door sash 30.

With such a structural arrangement, the foldable canvas top 3 which is provided for covering the opening 2 surrounded by the frame member 8 is moved by means of driving the wires 27 to a rear end of the roof portion 1 to be folded as shown in FIG. 1, so as to open the opening 2 and thereby provide an open-air feeling.

However, in the roof structure thus proposed previously, the opening 2 is fundamentally formed on the roof panel 4 by means of punching and therefore apt to be provided with a relatively small size, especially, in the direction of the width of the vehicle body, so that it is difficult to obtain sufficient open-air feeling such as enjoyed with the open car. Further, the roof panel 4 is easily twisted between the front panel portion 5 and rear panel portion 6 during a punching process in which the opening 2 is formed by punching and during an assembly process in which the roof panel 4 is combined with the vehicle body. This results in disadvantages that the productive efficiency of the roof panel 4 is reduced and the roof portion 1 of the vehicle body in which the roof panel 4 is included would not be assembled with accuracy.

OBJECTS AND SUMMARY OF THE INVENTION

Accordingly, it is an object of the present invention to provide an arrangement for forming a roof structure of a vehicle body including a foldable canvas top for covering an opening provided on a roof portion of the vehicle body, which avoids the aforementioned problems and disadvantages encountered with the prior art.

Another object of the present invention is to provide an arrangement for forming a roof structure of a vehicle body including a foldable canvas top for covering an opening provided on a roof portion of the vehicle body, in which the opening is easily formed to be of a relatively large size so that sufficient open-air feeling can be obtained.

A further object of the present invention is to provide an arrangement for forming a roof structure of a vehicle body including a foldable canvas top for covering an opening provided on a roof portion of the vehicle body, which can be assembled with accuracy to have the opening formed to be of a relatively large size.

A still further object of the present invention is to provide an arrangement for forming a roof structure of a vehicle body including a foldable canvas top for covering an opening provided on a roof portion of the vehicle body, which can be produced with the opening formed to be of a relatively large size in such a manner that improved productive efficiency is obtained.

According to the present invention, there is provided an arrangement for forming a roof structure of a vehicle body comprising a set of front and rear roof panel members disposed to face each other with an opening between, a pair of roof rail members disposed at both sides of the front and rear roof panel members to extend in a direction of the length of the vehicle body respectively and face each other with the opening between, a frame member disposed to engage partially with the front and rear roof panels and roof rail members so as to form a loop surrounding the opening and provided with a pair of opposite outer fringe portions fixed on the roof rail members respectively, a pair of guide rail members provided respectively on portions of the frame member each extending along the roof rail member, and a foldable canvas top provided with a plurality of sliding members each engaging with the guide rail members and disposed for covering the opening to be openable.

In the arrangement thus constituted in accordance with the present invention, the opening is formed with the front and rear roof panels and the roof rail members which are provided separately to surround the opening and surrounded also by the frame member disposed to form the loop on the front and rear roof panels and the roof rail members and provided with the side fringe portions fixed on the roof rail members, respectively. The frame member is provided with the guide rail members extending along the roof rail members respectively with which the sliding members provided on the foldable canvas top are engaged. Each of the sliding members is moved along the guide rail members and thereby the foldable canvas top is expanded to cover the opening and folded to open the opening selectively.

Since the front and rear roof panels and the roof rail members are provided separately for forming jointly the opening surrounded thereby, the opening can be provided easily with a relatively large size, so that sufficient open-air feeling is obtained. Further, a single roof panel which is provided thereon with an opening formed by means of punching and therefore is easily twisted during a punching process wherein the opening is formed by punching and during an assembly process wherein the roof panel is combined with the vehicle body, such as used in the previously proposed roof structure, is not employed, and therefore the arrangement can be assembled with accuracy to have the opening formed to be of a relatively large size, and can be produced with the opening having a relatively large size in such a manner that improved productive efficiency is obtained.

The above, and other objects, features and advantages of the present invention will become apparent from the following detailed description which is to be read in conjunction with the accompanying drawings.

BRIEF DESCRIPTION OF THE DRAWINGS

FIG. 3 is a fragmentary enlarged perspective and broken view showing the previously proposed roof structure;

FIG. 4 is a fragmentary sectional view of the previously proposed roof structure taken on line IV—IV in FIG. 3;

DESCRIPTION OF THE PREFERRED EMBODIMENT

The invention will now be described by way of example with reference to the accompanying drawings.

FIGS. 5 to 8 show one embodiment of arrangement for forming a roof structure of a vehicle body according to the present invention. In FIGS. 5 to 8, members, portions and parts corresponding to those of FIGS. 1 to 4 are marked with the same references.

Figure 1:
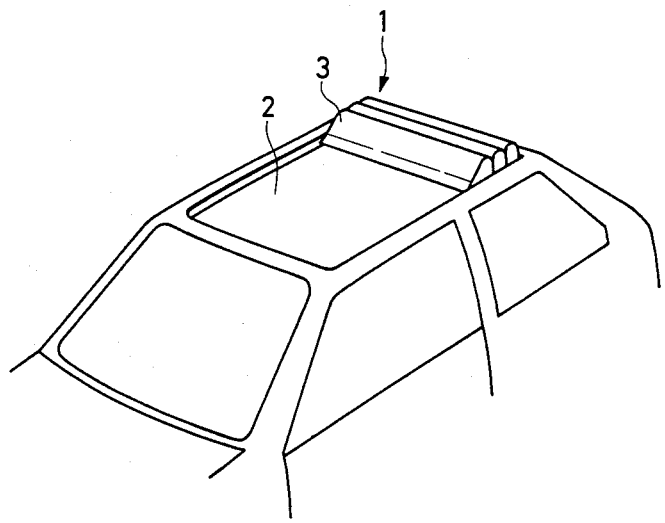
FIG. 1 is a schematic perspective view showing a previously proposed roof structure.
Figure 2:
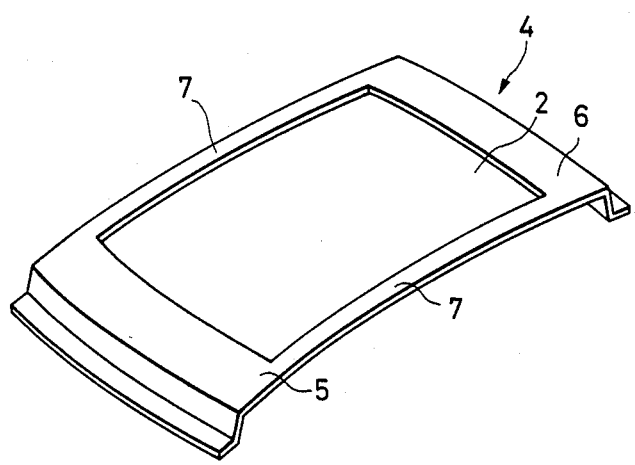
FIG. 2 is a schematic perspective view showing a roof panel used in the previously proposed roof structure shown in FIG. 1.
Figure 5:
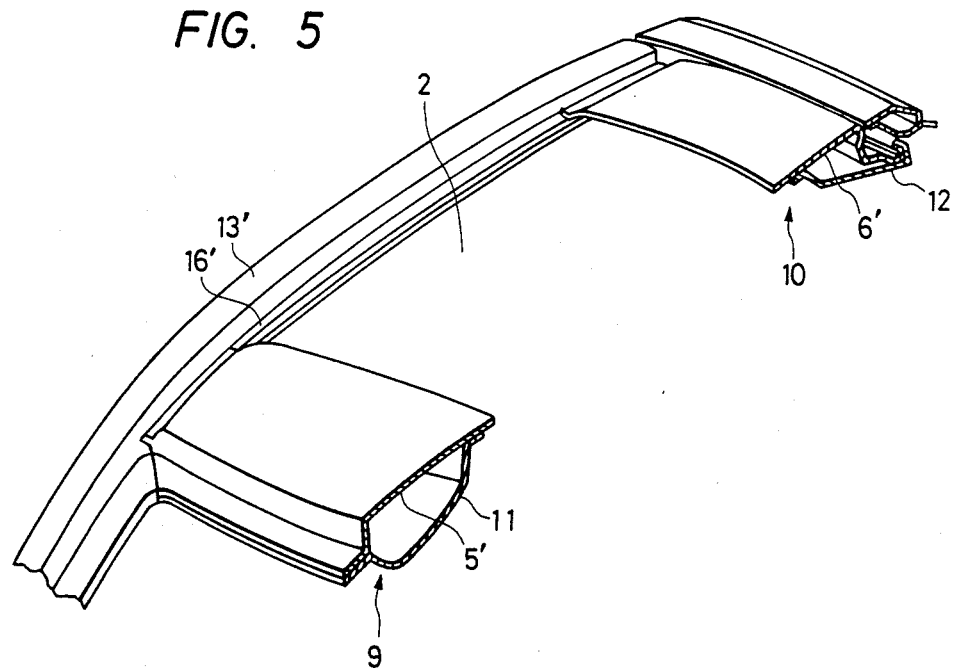
FIG. 5 is a fragmentary enlarged perspective and broken view showing a part of one embodiment of arrangement for forming a roof structure of a vehicle body according to the present invention.
Figure 8:
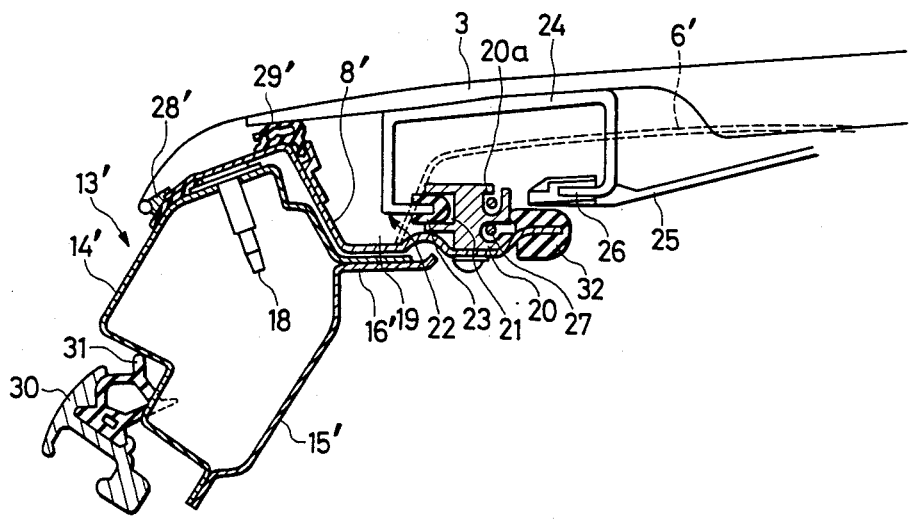
FIG. 8 is a fragmentary sectional view of the embodiment employing the part shown in FIG. 7.

FIG. 5 shows one of right and left halves formed symmetrically of a part of the embodiment according to the present invention, and in FIG. 5, a roof rail member 13' which comprises an outer rail panel 14' and an inner rail panel 15' which are connected with each other to form a closed cross section and a connecting flange portion 16' extending in a direction of the length of a vehicle body, as shown in FIG. 8, is provided. The roof rail member 13' is also provided in the other of the right and left halves, and therefore a pair of roof rail members 13' having the connecting flange portions 16' respectively are disposed to face each other with an opening 2 between.

A set of front and rear roof panels 5' and 6' are disposed to span a space between the roof rail members 13'. Each end portion of the front roof panel 5' in a direction of the width of the vehicle body is fixed on the connecting flange portion 16' of the roof rail member 13' and each end portion of the rear roof panel 6' in the direction of the width of the vehicle body is also fixed on the connecting flange portion 16' of the roof rail member 13', so that the front roof panel 5' and the rear roof panel 6' are positioned to face each other with the opening 2 between. Accordingly, the opening 2 is formed to be surrounded by the front and rear roof panels 5' and 6' and the roof rail members 13' which are provided separately.

Figure 6:
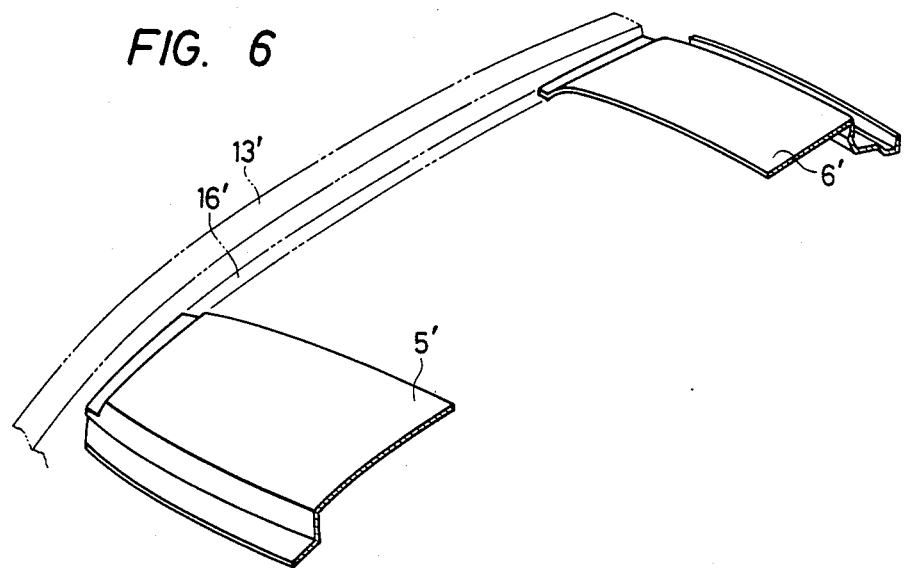
FIG. 6 is an enlarged perspective view showing a front and rear roof panels employed in the embodiment of arrangement for forming a roof structure of a vehicle body according to the present invention.

Each of the front and rear roof panels 5' and 6' which are disposed to face each other, as shown clearly in FIG. 6, is formed by means of press working. A front header member 11 is provided under the front roof panel 5' to be connected with the same so as to constitute a front framework 9 with a closed cross section. Similarly, a rear header member 12 is provided under the rear roof panel 6' to be connected with the same so as to constitute a rear framework 10 with a closed cross section.

Figure 7:
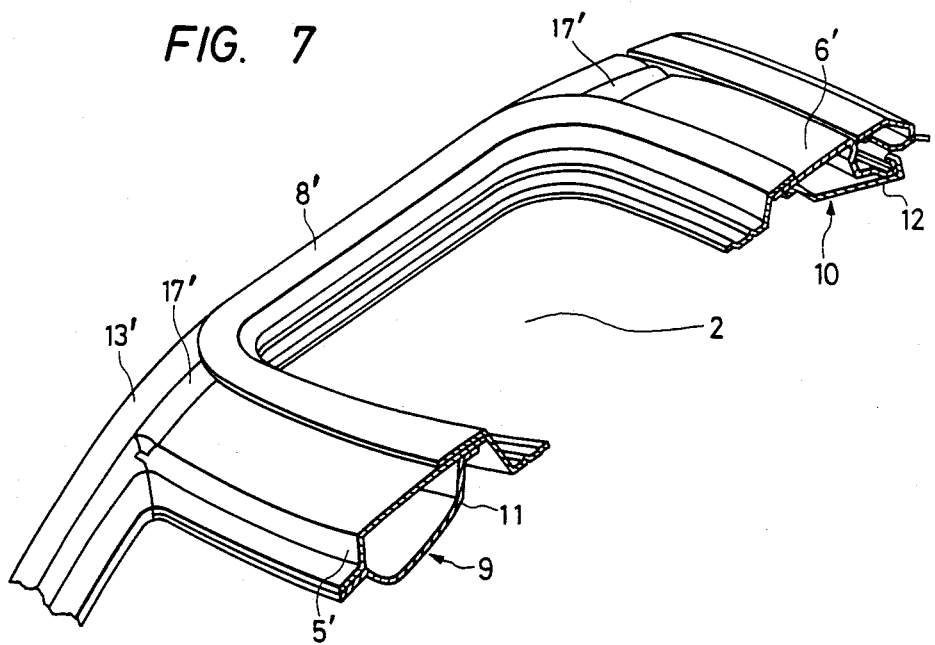
FIG. 7 is a fragmentary enlarged perspective and broken view showing a part of the embodiment of arrangement for forming a roof structure of a vehicle body according to the present invention.

As shown in FIG. 7 which illustrates one of right and left halves formed symmetrically of a part of the embodiment including the opening 2 and its periphery, a frame member 8' is disposed to engage with inner edge portions of the front and rear roof panels 5' and 6', each of which limits the opening 2, and also with the roof rail members 13' so as to form a loop surrounding the opening 2. The frame member 8' supports a foldable canvas top 3 (omitted to be illustrated in FIG. 3), which is provided for covering the opening 2 to be openable, to be movable for opening and closing the opening 2, as shown in FIG. 8 which is a fragmentary sectional view of a portion of the part of the embodiment shown in FIG. 7 located between the front and rear roof panels 5' and 6'. Further, a roof molding 17' is put in each of hollows between the front roof panel 5' and the roof rail member 13' and between the rear roof panel 6' and the roof rail member 13' for waterproofing and improving an external appearance of the vehicle body, as shown in FIG. 7.

Referring to FIG. 8, each of a pair of opposite outer portions of the frame member 8' extending along the roof rail member 13' is superposed on the outer rail panel 14' of the roof rail member 13' and fixed thereto by means of a plurality of fasteners 18. Further, the frame member 8' is provided with a pair of opposite inner portions, each separated from each of the outer portions by a connecting portion, including a pair of opposite rain gutters 19 each supported on the connecting flange portion 16' of the roof rail member 13' and also a pair of opposite guide rail members 20 each having a guide groove 21 and extending in the direction of the length of the vehicle body on each of the pair of opposite inner portions thereto. Each of the pair of connecting portions are spaced from the outer rail panel of each of the roof rail members, thus defining a double roof rail by the frame member at each of the roof rail members, as illustrated in FIG. 8.

A plurality of sliding members 22 connected to the foldable canvas top 3 are engaged with the guide rail member 20 to be movable along the same. Each of the sliding members 22 comprises a sliding shoe 23 engaging with the guide groove 21, a supporting portion 24 to which the foldable canvas top 3 is attached, and a bracket portion 26 on which a stay 25 for supporting an intermediate portion of the foldable canvas top 3 is mounted. Further, wires 27 are put in wire containing grooves 20a respectively formed on the guide rail member 20 and the foldable canvas top 3 is moved in the direction of the length of the vehicle body when the wires 27 are caused to run in the wire containing grooves 20a by a wiredriver.

Sealing members 28' and 29' are provided at an edge of each of the outer portions and at an uppermost edge of each of the connecting portions of the frame member 8', respectively, to be put between the frame member 8' and the foldable canvas top 3, and another sealing member 32 is also provided at an edge of the inner portion of the frame member 8', for waterproofing and soundproofing. Further, a sealing member 31 is provided between the outer rail panel 14' of the roof rail member 13' and a door sash 30.

In the arrangement thus constituted in accordance with the present invention, the foldable canvas top 3 which is provided for covering the opening 2 surrounded by the frame member 8' is moved by means of driving the wires 27 to expand to close the opening 2 and to be folded to open the opening 2. In such a case, the front and rear roof panels 5' and 6' and the roof rail members 13' are provided separately for forming jointly the opening 2 surrounded thereby, the opening 2 is easily provided with a relatively large size, especially, in the direction of the width of the vehicle body, so that sufficient open-air feeling is obtained.

In addition, since each of the edges of the outer portions of the frame member 8' extending along the roof rail member 13' is put to cover the outer rail panel 14' of the roof rail member 13' and fixed thereto, the hollows which are required to be filled up with the roof molding 17' are formed only at locations corresponding to the front and rear roof panels 5' and 6', so that roof moldings 17' each extending over the roof rail member 13' are not necessary and therefore the consumption of roof molding is effectively reduced. Further, the portion of the frame member 8' forming each of the rain gutters 19 is supported by the connecting flange portion 16' of the roof rail member 13', and therefore the frame member 8' is disposed stably to surround the opening 2.

What is claimed is:

1. An arrangement for forming a roof structure of a vehicle body comprising:

front and rear roof panel members disposed to face each other with an opening between and coupled with front and rear headers respectively to constitute front and rear frameworks, a pair of roof rail members defining sides to said opening wherein one of said pair of roof rail members is disposed at a side of said front and rear roof panel members to extend in a direction of the length of the vehicle body and the other of said pair of roof rail members is disposed at an opposite side of said front and rear roof panel members to extend in a direction of the length of the vehicle body, each of said roof rail members comprising outer and inner rail panels connected with each other to form a closed cross section and a connecting flange portion which projects substantially horizontally toward the inside of the vehicle body and extends in the direction of the vehicle body to connect partially with an end portion of said front and rear roof panel members, a frame member disposed to engage with said front and rear roof panel members and said roof rail members so as to surround said opening, said frame member having a pair of opposite outer portions extending along said roof rail members to be superposed on and connected to the outer rail panel of said roof rail members, a pair of opposite inner portions extending along said roof rail members on the inside of said outer portions wherein at least a part of each of said inner portions are to be superposed on and supported by the connecting flange portion of said roof rail members, a pair of guide rail members wherein one of said pair of guide rail members is provided on each of said pair of opposite inner portions interiorly of said connecting flange portion extending along said roof rail members, and a pair of opposite connecting portions provided between each of said outer and inner portions for interconnecting said outer and inner portions, each of said pair of connecting portions being spaced from the outer rail panel of each of said roof rail members, thus defining a double roof rail by said frame member at each of said roof rail members and a foldable canvas top provided for covering the opening and accompanied with a plurality of sliding members engaging with said guide rail members.

2. An arrangement according to claim 1, wherein said inner portions of the frame member on which the guide rail members are provided are located on the sides of the opening.

3. An arrangement according to claim 2, wherein each of said front and rear roof panels is coupled with the roof rail members in such a manner that a hollow is formed to extend in the direction of the length of the vehicle body adjacent the connection of each roof rail member and each of the front and rear roof panels.

4. An arrangement according to claim 3 further comprising a roof molding put in said hollow.

5. An arrangement according to claim 2, wherein said pair of inner portions of the frame member are each provided with a rain gutter supported on the connecting flange portion of the roof rail members.

6. An arrangement according to claim 5, wherein each of said guide rail members provided on each inner portion of the frame member is positioned between said rain gutter and an edge of the inner portion of the frame member.

7. An arrangement according to claim 6, wherein each of said sliding members comprises a sliding shoe engaging with one of said guide rail members, a supporting portion to which the foldable canvas top is attached, and a bracket portion on which a stay for supporting an intermediate portion of the foldable canvas top is mounted.

8. An arrangement according to claim 2 further comprising sealing members provided at an edge of each of the outer portions and at an uppermost edge of each of the connecting portions of the frame member respectively to be positioned between the frame member and the foldable canvas top.

9. An arrangement according to claim 8 further comprising another sealing member provided at an edge of each of the inner portions, of the frame member.

10. An arrangement according to claim 4 further comprising sealing members provided at an edge of each of the outer portions and at an uppermost edge of each of the connecting portions of the frame member respectively to be positioned between the frame member and the foldable canvas top and another sealing member provided at an edge of each of the inner portions of the frame member, wherein each of said inner portions of the frame member is provided with a rain gutter supported on the connecting flange portion of the roof rail member, each of said guide rail members is positioned between the rain gutter and the edge of each of the inner portions of the frame member, and each of sliding members comprises a sliding shoe engaging with one of the guide rail members, a supporting portion to which the foldable canvas top is attached, and a bracket portion on which a stay for supporting an intermediate portion of the foldable canvas top is mounted.

* * * * *